United States Patent [19]
Gressel et al.

[11] Patent Number: 5,852,665
[45] Date of Patent: Dec. 22, 1998

[54] INTERNATIONALLY REGULATED SYSTEM FOR ONE TO ONE CRYPTOGRAPHIC COMMUNICATIONS WITH NATIONAL SOVEREIGNTY WITHOUT KEY ESCROW

[75] Inventors: Carmi David Gressel, Kvutzat Urim; Itai Dror, Beersheva, both of Israel

[73] Assignee: Fortress U & T Ltd., Beersheva, Israel

[21] Appl. No.: 683,476

[22] Filed: Jul. 18, 1996

Related U.S. Application Data

[63] Continuation-in-part of Ser. No. 437,223, May 8, 1995, Pat. No. 5,664,017.

[30] Foreign Application Priority Data

Apr. 13, 1995 [IL] Israel ........................................ 113375

[51] Int. Cl.⁶ ............................... H04L 9/30; H04L 9/00
[52] U.S. Cl. ................................ 380/30; 380/21; 380/23; 380/25; 380/49
[58] Field of Search ............................. 380/4, 9, 20, 21, 380/23, 25, 30, 49, 50

[56] References Cited

U.S. PATENT DOCUMENTS

| | | | |
|---|---|---|---|
| Re. 34,954 | 5/1995 | Haber et al. | 380/49 |
| 5,079,733 | 1/1992 | Antoine et al. | |
| 5,136,646 | 8/1992 | Haber et al. | 380/49 |
| 5,136,647 | 8/1992 | Haber et al. | 380/49 |
| 5,163,154 | 11/1992 | Bournas et al. | |
| 5,166,978 | 11/1992 | Quisquater | |
| 5,214,701 | 5/1993 | Quisquarter et al. | 380/29 |
| 5,218,536 | 6/1993 | McWherter | |
| 5,285,403 | 2/1994 | Quisquater et al. | |
| 5,343,529 | 8/1994 | Goldfine et al. | 380/23 |
| 5,351,300 | 9/1994 | Quisquater | 380/46 |
| 5,557,346 | 9/1996 | Lipner | 380/21 |
| 5,557,765 | 9/1996 | Lipner | 380/21 |

OTHER PUBLICATIONS

Denning, D.E.R., "Cryptography and Data Security"; (Addison–Wesley; Reading, Mass.; 1982; section 3.6, pp. 161–164).

Denning, D.E., and Dennis Bransted, A Taxonomy For Key Escrow Encryptions Systems, ACM, Mar. 1996.

Keep The Invaders (Of Porivacy) Socially Sane–Kiss, viewgraphs used at Eurocrypt 1994, IACR Annual Advances in Cryptology, in Perugia, Italy, May 9, 1994.

Walker, S. et al., Commercial Key Recovery, ACM, Mar. 1996.

Ganesan, R., The Yaksha Security System, ACM, Mar. 1996.

Maher, D., Crypto Backup And Key Escrow, ACM, Mar. 1996.

Microelectronics IE With Modular Aritmetic Processor, SGS–Thomson Microelectronics, Agrate, Italy, Sep. 1994.

MC68HC055C29 8–Bit Microcomputer With EEPROM And N Modulo M Exponent Coprocessor Product Preview. Motorola Semiconductor Technical Data, Schaumberg, Illinois, 1993.

MC68HC055C30 Enhanced 8 Bit Microcomputer With EEPROM And N Modulo M Exponent Coprocessor Product Preview, Motorola Semiconductor Technical Data, Schaumberg, Illnois 1993.

(List continued on next page.)

*Primary Examiner*—Bernarr E. Gregory
*Attorney, Agent, or Firm*—Ladas & Parry

[57] ABSTRACT

This invention discloses an encryption method for generating an encrypted message which is controllably decryptable, the method including providing at least one agency public key to at least one decrypting agency entity respectively and to each of a first plurality of subscriber entities and to each of a second plurality of regulator entities, providing an ID, a public key and a private key for each of the first plurality of subscribers and each of the second plurality of regulators, for each subscriber entity and for each regulator entity, employing at least one agency public key to encrypt the entity's private key, and for each individual subscriber entity and for each individual regulator entity, generating a certificate attesting, for all other entities, to the individual entity's status, ID, public key and encrypted private key.

30 Claims, 11 Drawing Sheets

OTHER PUBLICATIONS

Rubenstein, R. H. Hardware Accelerator Is Public's Key To Card Security, New Electronics, pp. 13, 15–16 Apr. 1, 1994.

Rivest, R. L. et al., "A Method For Obtaining . . . " Communications Of The ACM, vol. 21, No. 2, pp. 120–126.

Secured Hash Standard, Federal Information Processing Standards Publication (FIBS)180–1, p. 178 May 1994.

SLE44C200 Cryptocontroller With 8 Bit Microprocessor, 140 Bit Crypto Arithmetic Unit, 10 Kbyte Rom 250(+350) Byte Ram, 25 Kybte EEPROM And Sleep Mode, Siemens Semi–Conductor Group 1993.

83C852 Secured 8–Bit Microcontroller For Conditional Access Application, Philips Components Aug. 1990.

Denning, D. E. et al. Key Escrowing Today IEEE Communications Magazine pp. 58–68 Sep. 1994.

Cryptography: The Key To Secure Communications *Challenge News And Views* From SGS–Thomson.

Microelectronics, Agrate, Italy, pp. 1,3 No. 2, Aug. 1994.

Micoli, S. Fair Cryptosystems Proceedings At Eurocrypto, 4, Perugia, Italy, May 10, 1994.

Denning, D. E. "An International approach To Key . . . " Presentation For International Cryptographic Institute, Washington, D.C. Sep. 1995.

Cryptoprocessor Chip Includes Embedded Cryptolibrary, SGS–Thomson Microelectronic.

Agrate, Italy, Press Release K491M Oct. 1994.

INTERNATIONALLY REGULATED SYSTEM FOR ONE TO ONE CRYPTOGRAPHIC COMMUNICATIONS WITH NATIONAL SOVEREIGNTY WITHOUT KEY ESCROW

This application is a continuation-in-part of Ser. No. 08/437,223 filed on May 8, 1995, now U.S. Pat. No. 5,664,017.

FIELD OF THE INVENTION

The present invention relates to encryption and decryption methods.

BACKGROUND OF THE INVENTION

State of the art encryption systems and relevant technologies are described in the following publications:

1. "Cryptography: the key to secure communication", Challenge News and Views from SGS-Thomson Microelectronics, Agrate, Italy, pp. 1–3, No. 2, August 1994.
2. B. Schneier, Applied cryptography, Chap. 10, John Wiley & Sons, Inc., 1994.
3. Secured smart card operating system reference manual, Personal Computer Card Corporation, Lakeland, Fla., December 1994.
4. RSA public key cryptography enhancement, Personal Computer Card Corporation, Lakeland, Florida, and Fortress U & T, Beer Sheva, Israel, December 1994.
5. Multi-Application secured smart card operating system, Personal Computer Card Corporation, Lakeland, Fla., December 1994.
6. ST16xF74 CMOS crypto-computer family ST16xF74, SGS-Thomson Microelectronics, Agrate, Italy, October 1993.
7. ST16CF54 CMOS MCU based safeguarded smartcard IC with modular arithmetic processor, SGS-Thomson Microelectronics, Agrate, Italy, September 1994.
8. MC68HC05SC29 8-bit microcomputer with EEPROM and N modulo N exponent coprocessor product preview, Motorola semiconductor technical data, Schaumberg, Ill., 1993.
9. MC68HC05SC30 Enhanced 8-bit microcomputer with EEPROM and N modulo M exponent coprocessor product preview, Motorola semiconductor technical data, Schaumberg, Ill., 1993.
10. R. H. Rubenstein, "Hardware accelerator is public's key to card security," New Electronics, pp. 13–16, April 1994.
11. Cryptoprocessor chip includes embedded cryptolibrary, SGS-Thomson Microelectronic, Agrate, Italy, press release K491M, October 1994.
12. R. Rivest, A. Shamir, and L. Adleman, "A method for obtaining digital signatures and public-key cryptosystems," Communication of the ACM, vol. 21, no. 2, pp. 120–126, Feb. 1978.
13. Secured hash standard, Federal Information Processing Standards Publication (FIBS) 180-1, May 1994.
14. SLE44C200 Cryptocontroller with 8-bit Microprocessor, 140-bit Crypto Arithmetic Unit, 10 Kbyte ROM 256(+350) byte RAM, 2.5 Kbyte EEPROM and Sleep Mode, Siemens Semiconductor Group, April 1993.
15. 83C852 secured 8-bit microcontroller for conditional access applications, Philips Components, August 1990.
16. D. E. Denning and M. Smid, "Key escrowing today," IEEE Communication Magazine, pp. 58–68, September 1994.
17. S. Micali, "Fair Cryptosystems," Proceedings Eurocrypt 95, IACR, Perugia, Italy, May 10, 1994.
18. D. E. Denning and Dennis Bransted, "A Taxonomy for Key Escrow Encryption Systems", draft of Sep. 24, 1994, personal correspondence.

The disclosures of the above publications and of the publications cited therein are hereby incorporated by reference. The disclosures of all publications mentioned in this specification and of the publications cited therein are hereby incorporated by reference.

SUMMARY OF THE INVENTION

The present invention seeks to provide an improved method and apparatus for international and national encryption and decryption of sensitive data so as to preserve confidentiality and message integrity and, under certain circumstances, to empower a designated agency or agencies, typically international, to aid sovereign nations in intercepting suspect communications.

The present invention also seeks to provide an encryption system in which law abiding entities can communicate and in which national sovereignty is retained in conjunction with international control. Each country is preferably able to decrypt messages initiated by one of its own nationals by obtaining knowledge of the secret key of the suspect national. Each National N of a particular country is preferably able to designate other countries which are listed in that National's NCF (national cross-over field). If National N lists country C on his NCF, country C is able to decrypt messages initiated by National N by obtaining knowledge of the secret key of National N.

Typically, country C cannot obtain knowledge of the secret key of an individual who is not a national of country C and who has not designated country C on his NCF list.

Optionally, an additional entity, other than the international agency or agencies can decipher communications between communicants who are subject to the additional entity. For example, a bank may impose upon the employees of the bank the requirement that communications between employees be decipherable by an authorized entity within the bank.

A particular feature of a preferred embodiment of the present invention is that "checks and balances" are provided such that communications may be monitored, however, no entity can easily abuse its privilege to monitor a confidential communication.

The present invention provides a complete protocol designed to be a controlled balance for ensuring honest citizens confidentiality in their communications while allowing legitimate law enforcement agencies the ability to make controlled responsible interception of messages sent by suspect individuals and organizations. It prevents unfettered use of cryptography by drug dealers, but allows legitimate organizations the use of open channeled networks without fear of having their messages intercepted by adversaries. The present invention provides proof to the sender and receiver, in advance of their inaugurating a communication, the knowledge of with whom they are conversing, and assures all users that if, for any reason, a law enforcement agency deems them suspect, the officers and judges who approve such intervention will be held responsible for allowing such a tap and that the reasons and results for such a tap will be properly archived, assuring a nondeniable record of the deposition requesting the tap, and the limited use of the tap both in time and in scope.

The protocol was developed as a logical usage of the emerging generation of secured monolithic cryptocomputers, de facto, and in some cases, de jure public key cryptographic methods and the only world wide accepted de jure single key conventional method of cryptography.

The protocol has two separate remotely linked aspects. One aspect, which covers the establishment of a secured communication session between two digital devices (telephones, terminals, personal computers, upstream-downstream cable television, etc.) with the option of using the new generation of public key cryptographic (PKC) smart cards and terminal devices and supporting software which can positively identify and hold responsible one or both of the human communicants using the digital device. This vital link grants maximum social protection to its users.

The second aspect is the mechanism which can be used by law enforcement agencies, which is policed by private organizations who are extremely motivated to ethically protect the legitimacy of the network and the confidentiality of the clients. The actions of these two private organizations are triggered by the legal system, while being separately monitored and "ideally" archived by a human rights entity and a branch of the judicial-legal community, to afford an undeniable reasonable control over any legalized intervention of a communicant's privacy.

There is thus provided in accordance with a preferred embodiment of the present invention an encryption method for generating an encrypted message which is controllably decryptable, the method including providing at least one agency public key to at least one decrypting agency entity respectively and to each of a first plurality of subscriber entities and to each of a second plurality of regulator entities, providing an ID, a public key and a private key for each of the first plurality of subscribers and each of the second plurality of regulators, for each subscriber entity and for each regulator entity, employing at least one agency public key to encrypt the entity's private key, and for each individual subscriber entity and for each individual regulator entity, generating a certificate attesting, for all other entities, to the individual entity's status, ID, public key and encrypted private key.

Further in accordance with a preferred embodiment of the present invention the at least one decrypting agency includes a plurality of decrypting agencies.

Still further in accordance with a preferred embodiment of the present invention each subscriber and each regulator generates his own private and public keys.

Additionally in accordance with a preferred embodiment of the present invention the method also includes providing a second subscriber's certificate to a first subscriber, and generating a first random string at a first subscriber entity, signing the random string using the first subscriber's private key and encrypting the random string using a second subscriber's public key and transmitting to the second subscriber the first subscriber's certificate and the encrypted and signed random number.

Moreover in accordance with a preferred embodiment of the present invention the method also includes generating a second random string at the second subscriber entity and combining the second random string and the encrypted and signed first random string, encrypting the combined strings using the first subscriber's public key and transmitting to the first subscriber, at the first subscriber entity, encrypting the encrypted combined strings using the second subscriber's public key and transmitting to the second subscriber, and decrypting the encrypted combined strings and transferring messages encrypted using the combined strings.

There is also provided in accordance with another preferred embodiment of the present invention an encryption method including providing first and second private keys to an encryption secret to first and second agencies, respectively, wherein the first and second private keys are characterized in that when employed in cooperation and only when employed in cooperation, a message encrypted using the encryption secret may be decrypted, and controlling cooperation between the first and second agencies.

Further in accordance with a preferred embodiment of the present invention the first and second private keys are stored in first and second secured electronic devices respectively.

Still further in accordance with a preferred embodiment of the present invention the first and second secured electronic devices include first and second monolithic secured electronic devices.

Additionally in accordance with a preferred embodiment of the present invention the method also includes archiving a record of the step of controlling cooperation between the first and second agencies.

Moreover in accordance with a preferred embodiment of the present invention the archiving step includes archiving the record in a plurality of separate archives.

There is also provided in accordance with another preferred embodiment of the present invention a system for controlling tapping of a suspect encrypted communication, the system including a multiplicity of security modules each operative to encrypt information using a different secret key and using at least one agency key which is common to all the security modules, wherein the encrypted information can only be decrypted using the secret key and at least one agency key, an agency security module which does not store the secret keys and which is operative to secure the agency key, and an agency access monitoring module operative to monitor access to the agency key.

Further in accordance with a preferred embodiment of the present invention each security module includes at least one integrated circuit.

Still further in accordance with a preferred embodiment of the present invention each security module includes a key securing device operative to secure a secret key from among a corresponding multiplicity of secret keys, and a public key cryptographic device operative to authenticate arriving information encrypted according to a public key cryptographic method and to generate a DRF and to encrypt information using the secret key and first and second agency keys.

Additionally in accordance with a preferred embodiment of the present invention combining includes concatenating.

Moreover in accordance with a preferred embodiment of the present invention combining includes XORing.

Further in accordance with a preferred embodiment of the present invention removal of any record from any of the archives is detectable.

Still further in accordance with a preferred embodiment of the present invention employing includes employing the at least one agency public key not necessarily with the agency's knowledge or implicit agreement.

Additionally in accordance with a preferred embodiment of the present invention the second plurality of regulators includes a third plurality of subsets of regulators, each subset being subject to an individual nation from among a third plurality of nations.

Moreover in accordance with a preferred embodiment of the present invention the at least one decrypting agency includes a third plurality of decrypting agencies including at least one decrypting agency subject to each of the third plurality of nations.

Further in accordance with a preferred embodiment of the present invention the step of transmitting to the second subscriber includes transmitting over an open channel.

Still further in accordance with a preferred embodiment of the present invention the step of transmitting to the second subscriber includes transmitting by a duplex-type channel.

Additionally in accordance with a preferred embodiment of the present invention the duplex-type channel includes a telephone connection.

Moreover in accordance with a preferred embodiment of the present invention the duplex-type channel includes a computer connection.

Further in accordance with a preferred embodiment of the present invention the method also includes providing a receiver subscriber's certificate to a sender subscriber, generating a sender-encrypted session key by generating a session key, encrypting the session key using the sender subscriber's public key and generating a receiver-encrypted session key by encrypting the session key using the receiver subscriber's public key, and sending to the receiver subscriber a message encrypted using the session key, the sender-encrypted session key and the receiver-encrypted session key.

Further in accordance with a preferred embodiment of the present invention the sending step includes the step of sending by electronic mail.

Still further in accordance with a preferred embodiment of the present invention the message and the encrypted session keys are sent signed by the sender subscriber.

Additionally in accordance with a preferred embodiment of the present invention the method also includes providing the public key of at least one key recovering subscriber to each of the first plurality of subscriber entities, and for at least one subscriber entity, generating a key recovery device by encrypting the subscriber entity's secret key using the public key of the key recovering subscriber.

Moreover in accordance with a preferred embodiment of the present invention the public key providing step includes placing the public key of the data recovering subscriber in a secure memory location within each of the first plurality of subscriber entities.

Further in accordance with a preferred embodiment of the present invention each subscriber entity operates in accordance with a protocol the subscriber entity cannot change and wherein the protocol prevents each subscriber entity from transmitting a message which has not been signed by the subscriber entity.

There is also provided in accordance with another preferred embodiment of the present invention a key recovering method including providing a public key of at least one key recovering subscriber to each of a plurality of subscriber entities, and for at least one of the subscriber entities, generating a key recovery device by encrypting the subscriber entity's secret key using the public key of the key recovering subscriber.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
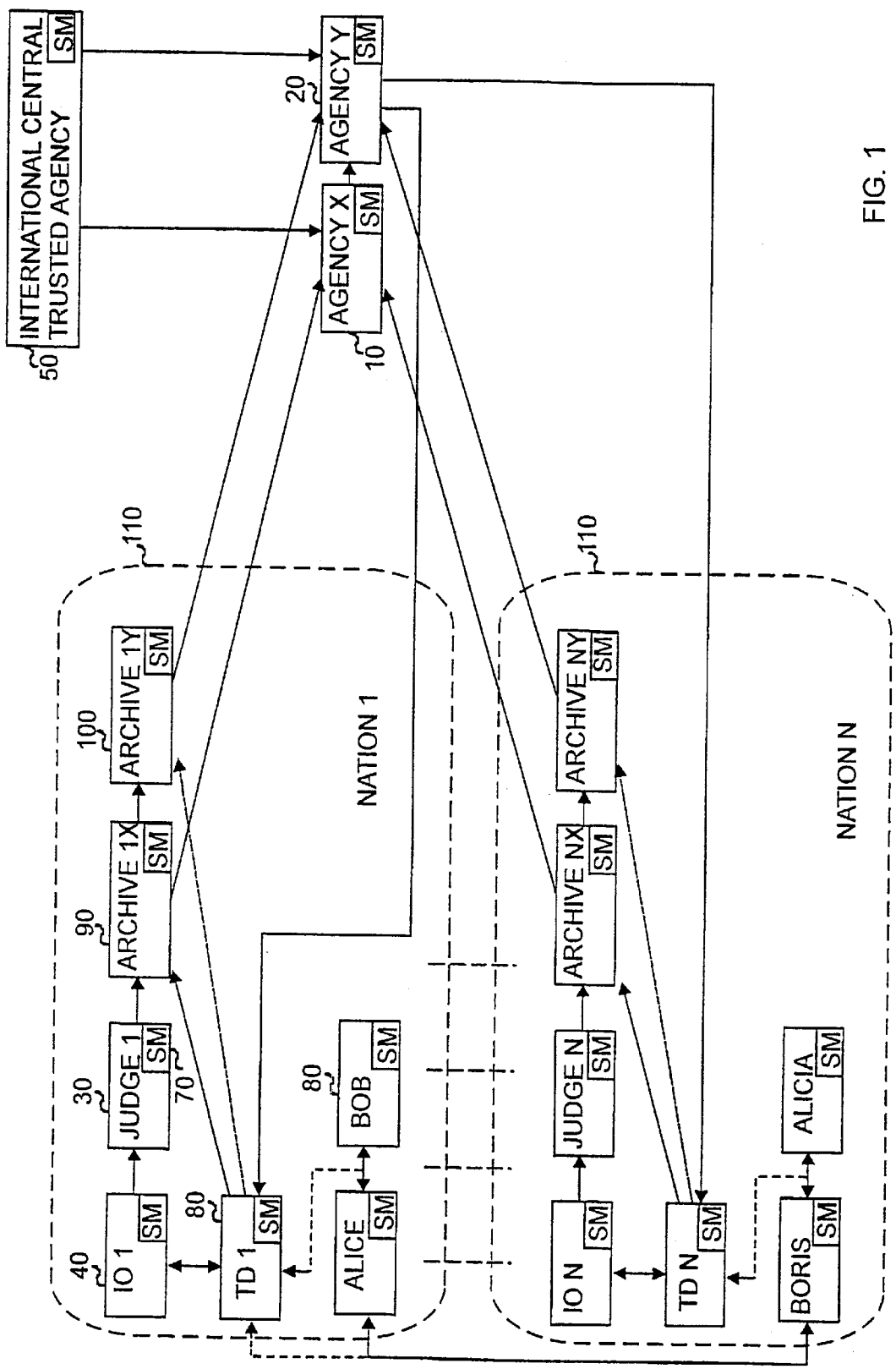
FIG. 1 is a block diagram of an encrypted communication system regulated by public key cryptographic methods, suitable for international or intranational communications, which system is provided in accordance with a preferred embodiment of the present invention.

The present invention provides a method for transmitting communications between a pair of communicating parties within a potentially very large population of communicating parties 80 which may or may not be located within a single nation, wherein the communication is legible to the communicating parties and is illegible to the public and to any entities other than those authorized by the authorized responsible encrypted communication monitoring system which is illustrated in block diagram form in FIG. 1.

In the present specification and claims, the terms "warrant commissioner" and "judge" are used interchangeably and the terms "national commissioner" and "head of state" are used interchangeably.

The monitoring system of FIG. 1 typically includes at least some and preferably all of the following components:

international agencies 10 and 20, nationally certified judges 30, nationally certified investigative officers (IOs) 40, an international central trusted agency 50, preferably established by agencies 10 and 20, tapping devices (TDs) 60 serving one or more IOs, a national archive 90 and, preferably, an additional archive 100 which may be either an additional national archive or an international archive or a national archive operating in conjunction with an international archive.

Each of the above components is preferably equipped with a secure module 70. Each secure module 70 securely stores a secret key of the component to which the secure module 70 belongs, double encrypted using the public keys of agencies X and Y. This double encrypted secret key is also termed herein a DRF (date recovery field), is used only for monitored tapping having "checks and balances" as described herein and is not used for any purpose in normal communication. For example, the secure module of a communicant called Alice stores Alice's DRF, i.e. Alice's secret key, double encrypted using the public keys of agencies X and Y.

Each country preferably determines whether, to whom and to what extent encryption devices with DRFs are available. For example, all communication devices may be required by law to be registered and identifying data and DRFs may be listed in a directory which is available to members of the general public. Alternatively, the directory may be available only to government agencies. Alternatively or in addition, members of the public or only certain authorized entities such as IOs (either generally or only upon receipt of a suitable permit) may be entitled by law to record data headers, including identifiers and DRFs, from cryptograms being transmitted over communication channels.

A preferred method for setting up the authorized responsible encrypted communication monitoring system of FIG. 1 is now described. The method is carried out by at least one and preferably two trusted third parties (TTPs), also termed herein "agencies" 10 and 20, who are motivated to protect the integrity of the system, a judicial system including a judge 30 and a law enforcement entity including a law enforcement official 40, also termed herein an IO (investigative officer), and a head of state or other preferably internationally accepted and recognized representative of a country, termed herein a "minister" (not shown).

Preferably, each TTP comprises an entity, such as an international credit company, which is motivated to protect the integrity of the network by preventing intervention therein except by sovereign governments controlled by the methods and apparatus described herein.

Each agency has a volatile memory which is preferably only sufficient to cope with concurrent activity and cannot retain information regarding long past activity.

Typically, a plurality of nations or countries 110 are included in the system of FIG. 1, each including IOs, judges, archives, and communicants who are nationals of that country.

The method for setting up the system of FIG. 1 typically comprises the following steps:

1. Select a minister. A minister is typically an individual who is charged, in a particular country, with ensuring that interception of communications encrypted in accordance with the teachings of the present invention can only be carried out by bodies acting in accordance with an authorized and accountable sequence of operations with built in checks and balances.

2. A trusted third party 50, preferably internationally recognized as neutral, and also termed herein "an international central trusted agency", authorizes at least one manufacturer (not shown) to generate a multiplicity of security modules (SMs) 70 which operate in accordance with an unchangeable protocol which determines operation in asymmetric and symmetric cryptographic modes. In a symmetric mode, pairs of communicants must have the knowledge of the same secret key—denoting a measure of trust between communicants. In a non-symmetric mode, pairs of communicants need not have the knowledge of the same secret key.

In a preferred embodiment, each security module generates its own secret keys and generates a cryptographic public key to be used by the other communicants making a firm communication link. Each security module preferably comprises a monolithic security device to prevent the protocol from being changed or the secrets or keys from being extracted.

The multiplicity of security modules includes a security module for each of agencies 10 and 20, a plurality of security modules for use by judges, a plurality of security modules for use by law enforcement officials, a security module for each of at least one archiving bodies, and security modules for each communicant 80 within a population of communicants.

The secure modules of agencies 10 and 20 store preprogrammed information, such as a key and a program which clearly defines the agency's protocols and functions.

3. In each country, archiving bodies 90 and 100 are set up by the minister which correspond to international agencies 10 and 20 respectively. Each archiving body is operative to authenticate requests to monitor confidential communications. Each request includes supporting documentation and the signatures of all involved parties such as judges and law enforcement officials. In a preferred embodiment, authenticated requests and results of each tap are stored in archives 90 and 100.

4. Each of the participants or components listed above is provided with or purchases a security module of the appropriate type, e.g. a security module programmed to implement the functionality of the particular participant as described herein.

Typically, each secure module comprises a secure electronic device such as a monolithic secure cryptoprocessor with its own internal secret key(s). Preferably, each internal secret key is internally generated by the secure module it serves and has never appeared in the clear in a probeable or legible fashion in either a computer or in any other legible medium.

Each TD comprises a cryptoprocessor such as a monolithic secure cryptoprocessor programmed such that, when the TD is supplied with a suspect's secret key, and under a controlled "checks and balances"situation, as described herein, the TD is able to extract a secret session key from the header of a communication session between two communicants, one of whom is suspect, and to use the session key to decrypt the encrypted dialogue.

The monolithic secure cryptoprocessor may be based on the modular arithmetic processor described in Published European Patent Application No. 934028655, Publication No. 0601907 A3; or on the modular arithmetic processor described in U.S. Pat. No. 5,261,001. Alternatively, the cryptoprocessor may be based on any of the integrated circuits described in Rubenstein, R. H., "Hardware accelerator is public's key to card security", New Electronics, April 1994, pp. 13–16.

Alternatively, the cryptoprocessor may be based on the SLE 44C200 cryptocontroller, commercially available from Siemens, or on the 83C852 microcontroller, commercially available from Philips, or on Motorola Semiconductor's MC 68HC05SC29 and MC 68HC05SC30, both described in Technical Data Sheets entitled "Product Preview, 8-bit microcomputer with EEPROM and N modulo M exponent coprocessor".

Alternatively, the cryptoprocessor may be based on the SGS-Thomson Cryptochip Emulator equipped with a suitable operating system and library. The architecture of the Emulator is similar to SGS-Thomson's ST16CF54 integrated circuit, which is a CMOS MCU based safeguarded Smartcard IC with modular arithmetic processor, and to SGS-Thomson's ST16×F74 CMOS cryptocomputer family. The architectures of the above SGS-Thomson products are described in Advance Data Sheets published by SGS-Thomson in October 1993. Generally, the ST16×F54 family and the ST16×F74 microcomputers are a family of monolithic Public Key CryptoComputers for High Security Smart Card based applications which are the basic building blocks for safe and versatile solutions to the implementation of the Public Key Standards accredited by the US National Institute of Standard Technologies, the American Bankers Association, the American Bar Association, the French Banking Association, and to the standards for securing EDI and ISDN.

The family of circuits combines SGS-Thomson microelectronic technologies with three fourth generation cryptographic operators developed by Fortress U & T; all offered in industry standard packaging.

The ST16CF54 has an intricate compact architecture with an optimized die size for easy card embedding, featuring an ISO 7816 standard care interface. The Fortress hardware enhancement is a Modular Arithmetic Processor (MAP) which can execute modular multiplication and squaring. Because of the latest advances in SGS-Thomson processing technologies, the integrated circuit has 480 bytes of CPU SRAM, 196 bytes of MAP serial SRAM, 16K bytes of user ROM, and 4K bytes of partitionable very high performance EEPROM, the latest single chip monolithic integrated circuit security devices, and a real random number generator. The coprocessor is optimized for 256 and 512 bit exponentiations, while maintaining 768 and 1024 bit capabilities to grant maximum system security. With Fortress software drivers, it can process all the popular cryptographic and authentication schemes in what was thought to be unattainable speeds. (A 512 bit RSA signature can be performed 20 times faster than with the present state of the art smart card cryptoprocessors.)

The second addition to the family is a group of five basic cryptographic "work-horses". These devices, designated ST16xF74, have a powerful 16XYZ core, will have 608 bytes of SRAM, 480 bytes of MAP serial SRAM, up to 20 KBytes of user ROM, a superfast Modular Arithmetic Coprocessor optimized for 256, 512, and 1024 bit operations, hardened on-chip integrated circuit security devices, two full speed real random number generators, and an optional DES accelerator capable of handling full speed X25 communications. With FORTRESS drivers this device can perform a full RSA 512 bit signature in 17 msecs and can generate and validate strong 512 bit RSA keys in about one second for insertion into Smart Cards. When used with a host computer, communication is executed through an 8 bit parallel bus interface and four user programmable registers. Two optional versatile bit configurable I/O ports (each 8 bits wide) and another 4 bit Output port make it easy to design a single integrated circuit hand-held device with a keyboard, a display, and up to 64 Kbytes of external RAM storage. The integrated circuits will be found in enciphered data keyboards, ISO-7816 standard Smart Card terminals, PCM-CIA Software Protection Interfaces, POS Terminals, High-Performance Transport, and Access Control & Contactless Transponders. The variants will be made available by a combination of metal masks and varied integrated circuit bondings. The full featured unit will be packaged in a standard 64 pin plastic PQFP.

As the generic SGS-Thomson 16XYZ core is used as the CPU in these products, most operating systems and firmware primitives can be reused to facilitate and accelerate the upgrading of symmetric security applications to the more versatile Public Key systems.

These products are designed using SGS-Thomson 1.0 $\mu$m EEPROM memory technology, featuring 10 year data retention which will easily endure 100K Erase and Write cycles. The security block guarantees memory integrity and confidentiality, and with the Public Key controlled access, all firmware and data can not be violated.

These functions and protocols can be implemented with extensions to a suitable operating system and a suitable library which are described in the following document: "Secured Smart Card Operating System Reference Manual", commercially available from Personal Computer Card Corporation, 5151 Lakeland Drive No. 16S, Lakeland, Fla.

Each security module is certified by an electronic signature of a trusted third party, such as an international central trusted agency 50, to prove that it is a true security module for the party it is intended to serve within an indicated time period.

The security modules 70 may be adapted for use with any type of communication device such as computer modems, secure telephones, facsimile machines and interactive TV.

The protocol for communicant security modules may be based on conventional cryptographic methods such as RSA in combination with DES. The RSA method is described in R. Rivest et al, "A method for obtaining digital signatures and public key cryptosystems", Communication of the ACM, Vol. 21(2), pp. 120–126, Feb. 1978. The DES protocol is described in Schneier, B. Applied Cryptography, Chapter 10, Wiley & Sons, Inc., 1994.

Figure 2:
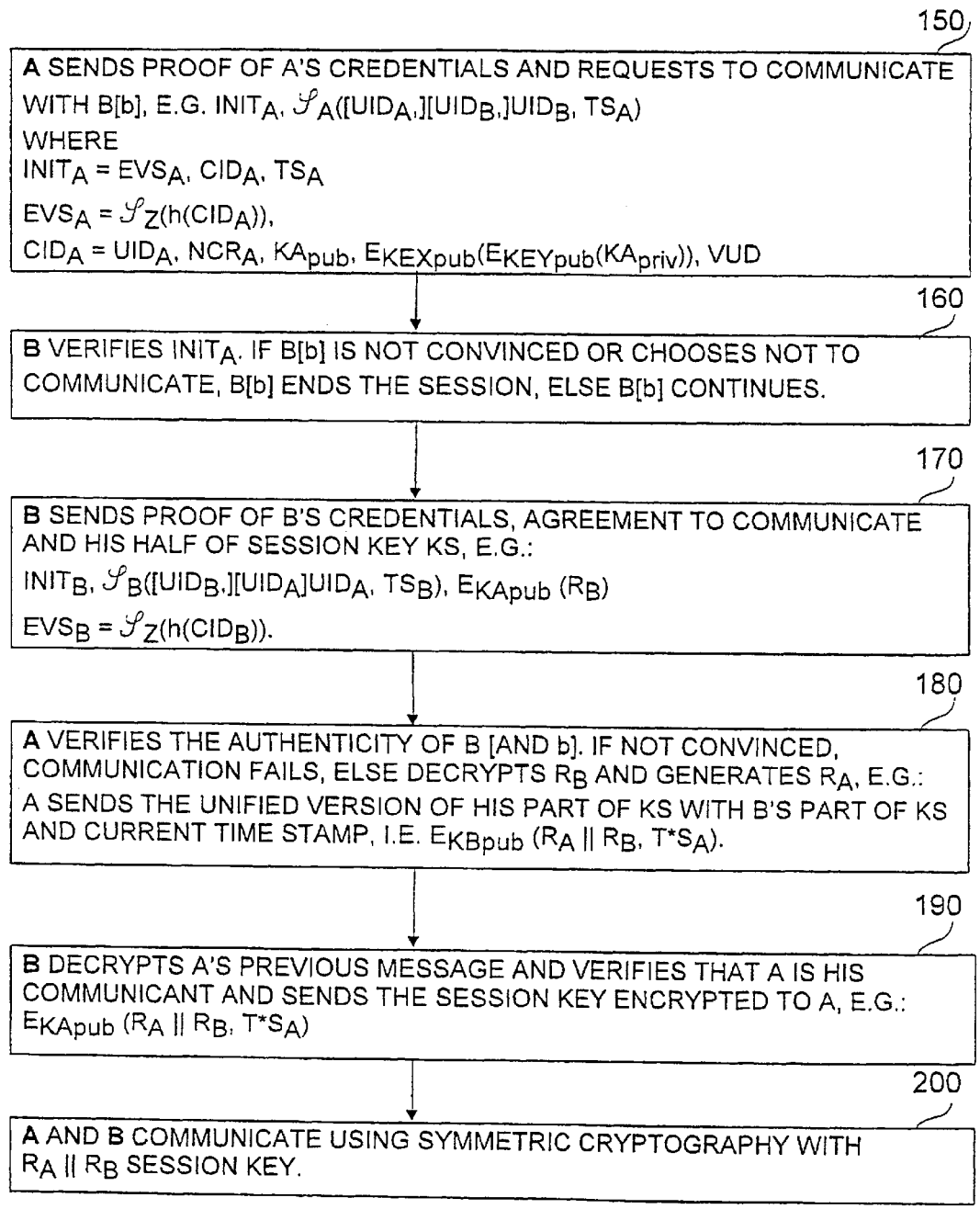
FIG. 2 is a simplified flowchart illustration of a method for establishing an encrypted dialogue between parties who wish to communicate, which dialogue can potentially be monitored by at least one nation.

A method for initiating a communication session between two communicants, an initiating party, termed herein "Alice" and a second party, termed herein "Bob", both of which are security modules, is now described with reference to FIG. 2. In FIG. 2, "A" and "B" denote the hardware possessed by Alice and Bob respectively and "a" and "b", optionally, denote specific users of the hardware or user-identifying devices possessed thereby, such as smart cards. "a" and "b" symbols are important particularly when there are a number of users of the same article of hardware.

STEP 150: Alice transmits information, certified by an agency, of her identity, to Bob. This certified information is stored in her secret module. Her identity typically includes the following information:

a. Lifetime of certification;

b. The list of country or countries to which Alice has agreed to restrict her communication activity, which list is also termed herein an "NCF National Crossover Field".

c. At least one secret key capsule which includes Alice's secret key encrypted so as to be accessible to the agency, if there is only one agency. If there is more than one agency, encryption is such that the secret key is accessible to the agencies either separately or in some combination, but may be inaccessible to certain agencies or combinations of agencies. Typically, each secret key capsule comprises a DRF, i.e. a secret key double encrypted using the public keys of the two agencies.

d. Alice's public key.

e. An identifier by which Alice is or will be known to Bob.

Alice also transmits to Bob a description of the party with which she desires to communicate and the time at which this request is being made, and her signature on the description and the time.

STEP 160: Bob verifies that the lifetime of the certification of Alice's identity has not terminated and that all of the components of information which Alice was to have transmitted, were in fact received in toto. Bob chooses whether to continue communication or not.

STEP 170: Bob generates a random number which will subsequently serve as a part of a secret session key for the proposed symmetric cryptographic communication session between Alice and Bob. Bob encrypts the random number using Alice's public key, and transmits to Alice:

a. The encrypted random number; and b. His identity, certified by an agency, and including the identity information described above.

STEP 180: Alice verifies that the certification of Bob's identity has not expired and that all of the components of information which Bob was to have transmitted, were in fact transmitted and received in toto.

Alice then decrypts the encrypted random number which arrives from Bob. Alice generates a random number which completes the secret session key for the proposed communication session between Alice and Bob. For example, the secret session key may be the concatenation of the random numbers generated by Alice and Bob. Alternatively, any other combination of the two random numbers may be employed, such as a XOR of the two random numbers.

Alice encrypts the concatenation or other combination of the two random numbers, using Bob's public key, and transmits the encrypted concatenation to Bob.

STEP 190: Bob decrypts the concatenation or XOR or other combination of his own and Alice's random numbers and authenticates Alice's identity. Bob ascertains that the result of the decryption process includes his own random number which he has generated. Bob encrypts the secret session key using Alice's public key and transmits the encrypted concatenation to Alice.

STEP 200: Bob and Alice communicate, transmitting the desired message encrypted with the secret session key. Because the secret session key has been transmitted in Alice public key-encrypted form and in Bob public key-encrypted form, the information conveyed during the session is accessible both to a responsible party who is authorized to use Alice's secret key and to a responsible party who is authorized to use Bob's secret key.

A preferred interpretation of the symbols used in FIG. 2 is now described. The symbols used in FIG. 2 and other figures are also based on the symbol system employed in the above-referenced publication by Denning and Smid. Also described herein are preferred implementations for other symbols and terms employed in accordance with a preferred embodiment of the present invention:

[ ]—Optional items symbol.

∥—Concatenation symbol, denoting chaining two strings together. In optional embodiments, the symbol may denote other combining operations performed on random strings generated by two subscribers, to be used as session keys for symmetric cryptographic communications.

A—Hardware employed by a first communicant, called Alice or Alicia.

Agency$_X$—An International trusted agency 10, the repository (the first of two, in the preferred embodiment) of a secret asymmetric PKC key necessary for unwrapping a suspect subscriber's secret asymmetric key, when properly requested by the qualified representatives of a national government. Denning calls such agencies escrow agencies, as they are trusted with the ability to extract communicant's secret asymmetric keys.

Agency$_Y$—An International trusted agency 20, the repository (the second of two, in the preferred embodiment) of a secret asymmetric key necessary for completing the unwrapping of a suspect subscriber's secret asymmetric key when properly requested by the qualified representatives of a national government.

Archive$_{NX}$—A computerized archive 90 in Nation N, which is designed to record in a tamper detecting accountable fashion, all petitions for taps of SM devices whose NCF includes Nation N. It forwards the DRF to Agency$_X$ and the archive record which includes the petition to Archive$_{NY}$.

Archive$_{NY}$—A (second in the preferred embodiment) computerized archive 100 in Nation N, which is designed to record in a tamper detecting accountable fashion, all petitions for taps of SM devices whose NCF includes Nation N. This archive might alternatively be an international archive, or an archive which would be duplicated in an Internationally trusted environment and also in a national environment. It forwards the DRF, the authorized expiration time allowed for the tap, and the UID of the suspect to Agency$_Y$.

Agency$_{XJ}$ or Agency$_{YJ}$—In the embodiments of FIGS. 7–11, J pairs of national agencies, trusted as the repository of one of the secret asymmetric keys used for unwrapping a suspect subscriber's secret asymmetric key, when properly requested by the corresponding national archive. This differs from the embodiment of FIGS. 1–6 where the International Agencies ($X_1$, $Y_1$, ..., $X_J$, $Y_J$) in each of a plurality of countries are replaced by a single pair of agencies X and Y located in neutral countries.

B—Hardware employed by a second communication, called Bob or Boris.

CG—Closed Group of subscribing communicants, e.g., the employees of a bank, whose encrypted messages may be deciphered either by officers of the closed group, without international intervention with the closed group DRF, or by controlled national requests through the international agencies using the normal DRF.

CID—The list of the following items: UID, NCR, public key, doubly encrypted private key (DRF) and VUD.

CO—Certified company officer 310. In a closed group any officer of such a company whose position qualifies him to operate the closed group's internal archive and system secret asymmetric repository 320 and/or tapping device for purposes of intercepting an encrypted communication involving at least one member of the closed group.

Certification—of a subscriber, typically by the national commissioner for the subscriber's country; or of a national commissioner, typically by the international central network commissioner: The process of providing the subscriber with a certificate or "entitlement verification string" as described herein.

Cryptocomputer—A very secure electronic device, preferably monolithic, with state of the art memory and internal bus protection. Such devices must be capable of performing all asymmetric cryptographic functions, preferably based on modular arithmetic and at least provide the session key for symmetric cryptographic functions. Devices of this type are commercially available to qualified operators for use in smart cards and terminals. All SMs have cryptocomputers.

DES—The most accredited symmetric cryptographic system. In a symmetric system, pairs of communicants must have the knowledge of the same secret key—denoting a measure of trust between communicants.

DRA—Data Recovery Agency—a licensed and/or certified entity to enable users to recover data which was encrypted with a failed security module, and/or to enable an SM issue to clone a failed security module, as described in detail below with reference to FIG. 11.

DRF—Data Recovery Field. The field or fields in the EVS in a communicant's device which contains the "capsule" which can be used under a system of checks and balances to obtain the communicants secret symmetric session key. This capsule is the communicant's secret asymmetric key encrypted during one of the phases of manufacture or issuance, once with each of the public keys of preferably two Agencies, and one or more DRFs for optional closed groups.

email, electronic mail—any electronic data transmission which can take place without a preambled handshake between the communicating entities. Usually, such communications will not occur online, but will be transmitted in due time by a service such as, for example, the Internet.

$EKEX_{pub}(EKEY_{pub}(KA_{priv}))$—The doubly encrypted private key of

A. This key is encrypted once using AgencyX's public key and once using Agency$_y$'s public key.

$E_{KEXpub}(E_{KEYJpub}(KA_{priv}))$—also termed herein "DRF capsule": the doubly encrypted private key of A. This key is encrypted once using Agency$_X$'s public key and once again using Agency$_y$'s public key. This is for embodiments where more than one pair of agencies within a Nation is certified by the National Commissioner.

$EKEW_{pub}(KA_{priv})$—The encrypted private key of A by any of the organization's public key, an optional DRF.

$E_{KF}$—Encryption using a symmetric encryption key algorithm, wherein the same key, KF, is used both for encryption and decryption.

$EVS_A$—Entitlement Verification String of A. This is a string, signed by the National Commissioner, on a hash of all of the data, which is used to certify A as a subscriber in the multinational system. It includes A's UID, A's NCF, A's public key, A's secret key which was doubly encrypted using Agency$_{Xi}$'s or Agency$_{Xj}$'s certified public keys, A's VUD, and the date of expiration of A's entitlement. In the embodiments of FIGS. 7–11, the $EVA_A$ should include the nation's certificate signed by the International Network Commissioner.

FH—The file or message header which contains the following certified fields: $EVS_A$, $CID_A$, $TS_A$, $EVS_B$, $CID_B$, $[UID_a]$, $[UID_b]$, $E_{KEApub}(KF)$, $E_{KEBpub}(KF)$, $[E_{KEapub}(KF)]$, and $[E_{KEbpub}(KF)]$ are sent for potential data recovery. This is for the electronic mail.

FR—The first record in an email message.

h( )—The hash operator. A one-way digital function which transforms, in a collisionless manner, a generally longer digital record into a shorter string which can then be operated on by a public key cryptographic signature function. his, her, he, she—Pronouns used interchangeably to denote subscribers to the crypto network, without regard to gender.

ICNC—International Central Network Commissioner. A trusted international entity whose public key(s) are embedded in the ROMs of all communicants. (There can be more than one ICNC and an ICNC can have and issue more than one public key, for present and future use.) The ICNC regulates and certifies all hardware and can monitor to ascertain that said hardware is used properly, but cannot read or access contents of archives or known or access user's identity or public keys.

ID—A binary identifying string of a communicating device.

$INIT_A$—Initialization string which A transmits to the second communicant in the leading portion of a transmission along with A's signed request or agreement to communicate. This string is a verifiable proof to the second communicant of the identifying details of A, which can be authenticated by any subscriber in the defined system.

IO—Investigative officer. An officer of a nation, certified by the National Commissioner, to prepare a petition to a Warrant Commissioner, to make a tap of a suspect, and/or to operate a TD.

IR—The initial record in an archive, usually a dummy.

Judge$_K$—An authorized Judge 30 in Nation K. Refers both to the Judge and to his SM apparatus. The Judge's SM can only accept a request to tap a suspect who is either a national of Nation K, or accept a request to tap a foreign national who has agreed, when acquiring his encryption device, to be subject to the cryptographic regulations of Nation K, i.e., a suspect whose NCF includes Nation K.

$KA_{pub}$—A's public asymmetric cryptographic key, e.g. the key used in the RSA system by another communicant for encrypting messages to A, or alternatively by another communicant to validate A's signature on a message or a hash. This key can be in the public domain.

$KA_{priv}$—A's private or secret asymmetric session key. A key which, in the preferred embodiment, is generated in a fashion that never becomes legible in usable form to any entity or device except A's device in any medium, which is used by A to prove his identity, and to exchange secret symmetric session keys with another communicant.

KF—The file key used in an email type (one-way) message. It contains the session key in two versions—once encrypted to the receiver and once to the sender. This provides for recovery of data by the receiver or by an IO if either the sender or the receiver is suspect.

KS—The secret symmetric session key. This key is used to protect symmetric cryptographic (e.g., DES) communication between two communicants in the described system. It is generated by the two communicants, SMs, using, in the preferred embodiment, a real random number generator.

$KZ_{NA}$Pub—A's National Commissioner's public key.

Minister—The person or group of people, designated in a nation to select and certify Ios and Judges, and the monitors and archivists of the system.

Nation—A sovereign entity, which has chosen to regulate use of cryptography in this defined system, through a set of local and international checks and balances.

National Commissioner—The person or group of people, designated in a nation to select and certify at least IOs, Warrant Commissioners, and archives of the system, to certify subscribers, and preferably to certify at least a pair of key recovering agencies. In some nations, this may be a judge, i others this may be a member of the ruling cabinet. The National Commissioner is responsible to see that the network is regulated to properly follow nationally designated strategies by, for example, selecting and certifying monitors within the nation.

NCF—National Crossover Field. This is a string of national identifiers, which states in an undeniable fashion, for which country or countries a subscriber has allowed his communications to be monitored under the scrutiny of the system defined here.

PKC—Public Key Cryptography. Any of the several mathematical methods, which usually employ modular arithmetic calculations, wherein every subscriber has its own secret key, which must be safeguarded, and a public key, which is in the public domain. Public Key—A publicly known binary string used by communicants to either preferably verify signatures made on hashes or to encrypt data by other communicants to the holder of said public key.

Private Key—See secret asymmetric key.

$R_A$—A random string generated by A.

$R_A \| R_B$—A random string, to be used as a symmetric cryptographic key by A and B, which was generated by both A and B, and combined using concatenation or other means.

RSA—The acronym for the Rivest, Shamir, Adleman public key cryptographic method used for transmitting cryptographic messages and authenticating origin and validity of data. This is the most popular PKC method used today.

RWT—The preferred data to be included in a petition to a judge, submitted to request a tap.

$S_A(\ )$—digital signature of A on the information enclosed in the braces, the S of $S_A$ being shown in the drawings as a script S.

$S_Z(\ )$—digital signature of Agency$_X$ or Agency$_y$ or an Agency that was authorized by the International central trusted agency, the S of $S_Z$ being shown in the drawings as a script S.

Secret (Asymmetric) Key—The secret key held by a communicant in a public key cryptosystem, which is used for decrypting data sent to the communicant and also in a signature on data, to be used for purposes of authentication.

SM—Security Module 70. A device containing a crypto-computer programmed to pursue a very narrowly defined set of functions for subscribers, agencies, judges, ministers, archives, and officers.

Subscriber—A device or entity operative to send and/or receive encrypted messages, as defined in this system including authorities such as agencies, archives, commissioners, investigative officers, all as defined herein.

Tap—The process of intercepting a communication, in a manner preferably not detectable by the communicants, by a certified officer of a nation, using a tapping device.

TD—Tapping Device 60. A device which has been entrusted with a suspect's secret key with the purpose of intercepting (tapping) the suspect's communications.

$Ts_A$—Timestamp of A. A binary string, which a device transmits denoting the date and time of initiating a communication.

$T^* s_A$—A subsequent Timestamp of A.

TTP—Trusted Third Party, is a generic entity whose purpose is to regulate a public key cryptographic system. The one or more TTPs provide the means where entities of varied and possibly conflicting interest can communicate. Optionally, a hierarchy or TTPs can be defined.

User—A subscriber other than an authority.

$UID_A$—Unique ID of A. A binary string which satisfactorily identifies A.

VUD—Valid Until Data. The expiration date of a certificate. It defines until when a communicant or officer's SM will be operative.

Warrant Commissioner$_K$—An authorized Warrant Commissioner 30 in Nation K; also referred to herein as "judge". Refers both to the Warrant Commissioner and to his SM apparatus. The Warrant Commissioner's SM can only accept a request to tap a suspect who is either a national of Nation K, or can accept a request to tap a foreign national who has agreed, when acquiring his encryption device, to be subject to the cryptographic regulations of Nation K, i.e., a suspect whose NCF includes Nation K.

Figure 3:
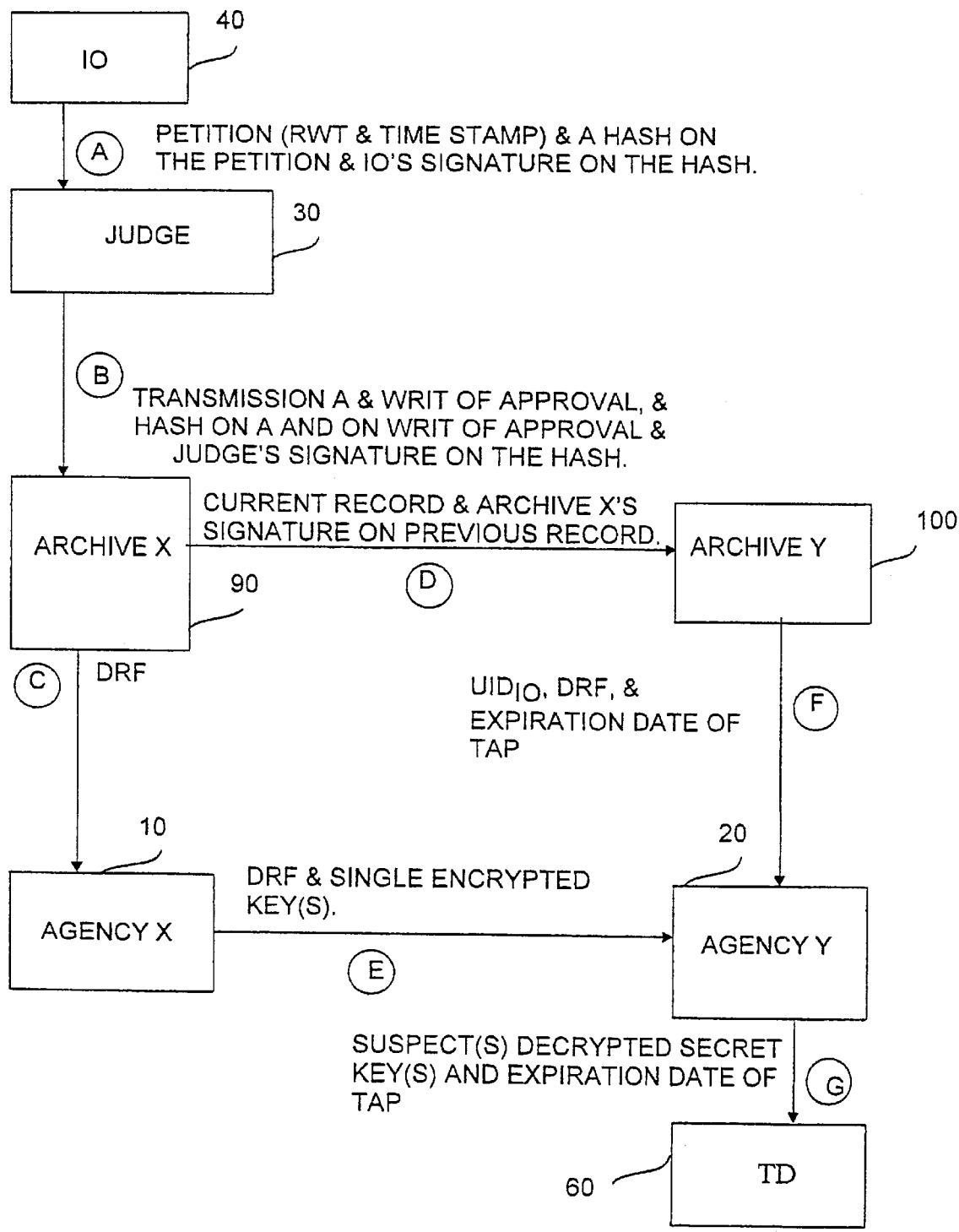
FIG. 3 is a diagram of transmissions between the components of the monitoring system of FIG. 1 in the course of a monitored tapping process in which an investigative officer taps a suspect communication between parties and the tapping procedure is monitored and documented by the system of FIG. 1.

FIG. 3 is a diagram of transmissions A–G between the components of the monitoring system of FIG. 1 in the course of a monitored tapping process in which an investigative officer taps a suspect communication between parties and the tapping procedure is monitored and documented by the system of FIG. 1.

The transmissions of FIG. 3 are generated in accordance with the following procedure:

Transmission A: The Investigative Officer, 40, petitions the Judge 30 to allow a particular suspect communicant 80, such as Alice, to be tapped. The petition is in digital form and includes:

a. An RWT which preferably includes the following information:

R—Reasons for tap, i.e. a statement of the reasons for wanting to tap the suspect;

W—Who is the suspect? i.e., typically the authenticated identity of the suspect including, optionally, the suspect's DRF, i.e. the double encrypted secret key or keys of the suspect. Alternatively, the authenticated identity of the suspect may comprise a unique ID and the DRF corresponding to the unique ID may be obtained by the IO only after the petition is authorized by the judge.

T—The period of time over which it is desired to tap the suspect.

b. the IO's time stamp, $TS_{IO}$, which indicates the time and date at which petition to tap was transmitted. The time stamp is typically provided by the clock of the IO's security module 70.

The petition, including the RWT and the time stamp, is hashed, using a hash function h, and the hash of the petition is digitally signed by the IO. Transmission A includes the petition in plain text, the hash of the petition, and the digitally signed hash of the petition.

Of course, transmission A may be encrypted by the IO so as to be decryptable by the judge upon receipt. More generally, all of the transmissions A–G are preferably transmitted securely so as to be legible only to the intended recipient.

A suitable hash function, h, is described in the following publication: "Secured hash standard", Federal Information Processing Standards Publications (FIBS) 180-1, May 1994, available from the National Institute of Standard Technology, Bldg. 225, Room A216, Gaitersburg, Md., 20899.

A suitable digital signature can be applied using the RSA method described in the above-referenced Rivest et al publication.

Transmission B: The judge receives the signature on the hash, the hash and the petition in plain text. The judge authenticates the hash and employs a validation technique such as RSA to validate the authenticity of the Investigative Officer and of the petition. Preferably, the judge performs his own hash of the petition, authenticates the IO's signature on the hash of the petition using, for example, the RSA method, and compares the result to the hash of the petition.

Preferably, the judge's security module also determines whether the country under whose jurisdiction he operates is included on the NCF list of the suspect and if not, the judge's security module automatically rejects the petition.

The judge reads the petition in plain text and decides whether or not to approve the petition and optionally generates a writ of approval which includes information regarding conditions under which the petition is approved including the date at which the tap expires. The judge's security module hashes Transmission A, together with the writ of approval, if any, and signs the hash. If the petition is approved, $Archive_X$ receives a transmission B which comprises Transmission A in clear text, the writ of approval, if any, in clear text, the hash on Transmission A and the writ, and the judge's signature on the hash. If the petition is not approved, transmission B is preferably not sent or alternatively a transmission B is sent whose contents differ from the contents described above.

If no approval of the petition is sent, the $Archive_X$ does nothing with the information arriving from the judge, if any, other than to store the information. If approval arrives from the judge, then $Archive_X$ sends transmission C to $Agency_X$ and transmission D to $Archive_Y$.

Transmission C—$Archive_X$ employs its security module to verify the integrity of the records contained therein, and only then assembles an archive record, which includes the components a–e described below, adds the new record to the archive, and transmits the suspect's DRF, i.e. the suspect's double encrypted secret key which is included in the W component of the RWT to $Agency_X$.

Figure 6:
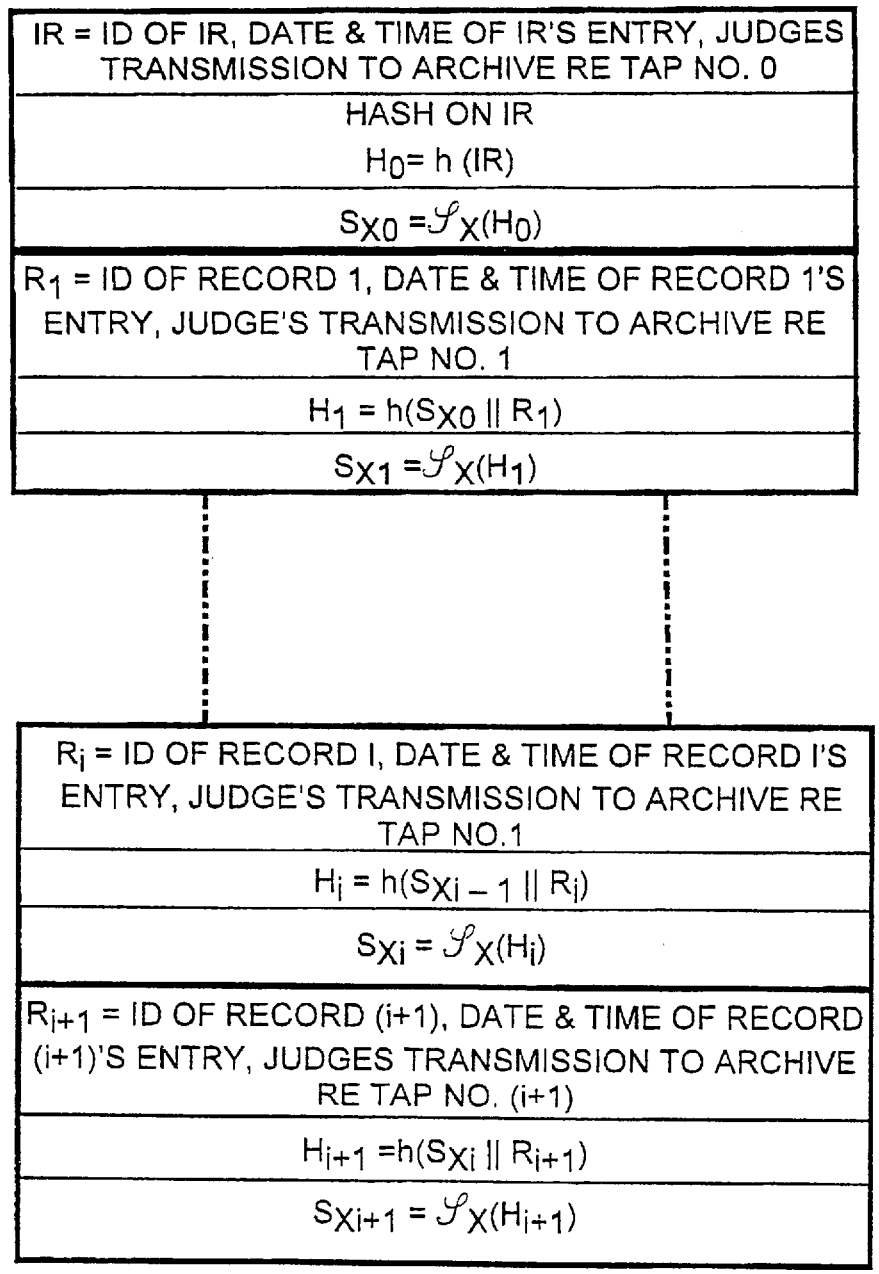
FIG. 6 is a diagram of an archive comprising a plurality of records, which is provided in accordance with a preferred embodiment of the present invention.

As illustrated in FIG. 6, which illustrates four archive records (record 0 (IR), record 1, ..., record i and record (i+1), each record in the archive preferably comprises:

a. An indexing ID;
 b. The date and time at which the record entered the archive;
 c. Transmission B;
 d. A hash of $Archive_X$'s signature of the previous record with (a), (b), and (c).
 e. $Archive_X$'s signature of the hash (d). The first record in the archive, Record 0, also termed herein an initialization record (IR), includes a dummy component d, which could be signed by $Archive_Y$ and then signed and hashed by $Archive_X$.

It is appreciated that due to the inclusion of components (d) and (e) in each record, the integrity of the archive can be verified.

A preferred method for self-verification of an archive's records is now described:

a. In a complete verification process, the archive's signature on the initial hash $H_o$, as in FIG. 6, is validated. The first record in the archive, termed IR (initialization record) is hashed by the verifier into $H_o^*$ and the first record is compared with $H_o$.
 b. If the archive s signature is valid, i.e. if it corresponds to the archive's public key, and $H_o$ is identical to $H_o^*$, then IR is known.

c. Each record i in the archive is then checked as follows:
    i. The validity of the Archive's signature on a hash of record i (the ith hash) is checked. If the signature is valid, continue, otherwise an error is reported.
    ii. The signature of the (i−1)th record, concatenated with record i, is hashed and compared with the ith hash.
    iii. If the signature is authentic and hashes are identical, then the verifier knows that the record is valid and that the Archive is accountable for the contents of the record. The verifier proceeds to the next record.

Transmission D—$Archive_X$ sends $Archive_Y$ the current record and its own signature of the previous record.

Transmission E—$Agency_X$ unwraps the "outer layer" of the suspect's double encrypted secret key (DRF), using $Agency_X$'s secret key, thereby to obtain the suspect's single encrypted secret key, which is sent to $Agency_Y$ together with the DRF.

Transmission F—$Archive_Y$ sends $Agency_Y$ the DRF of the suspect, the expiration date of the tap on the suspect (which information is obtained from the writ of approval) and the UID (unique identification number) of the IO who petitioned for the tap.

Transmission G—Upon receipt of identical DRF's from the $Agency_X$ and from the $Archive_Y$, $Agency_Y$ unwraps the "remaining layer" from the suspect's single encrypted secret key which arrived from $Agency_X$, using $Agency_Y$'s secret key. $Agency_Y$ sends the decrypted suspect secret key to the TD of the IO who is petitioning to tap, together with the expiration date of the tap. Again, as described above, the decrypted suspect secret key is decrypted in the sense that the agency's public key encryption has been unwrapped; however, the secret key is preferably sent to the IO in encrypted form, using the public key of the intended recipient, i.e. of the IO's TD.

It is appreciated that the method of FIG. 3 prevents subsequent denial of the contents of the petition or of the petition itself and is designed to prevent deception.

Figure 5:
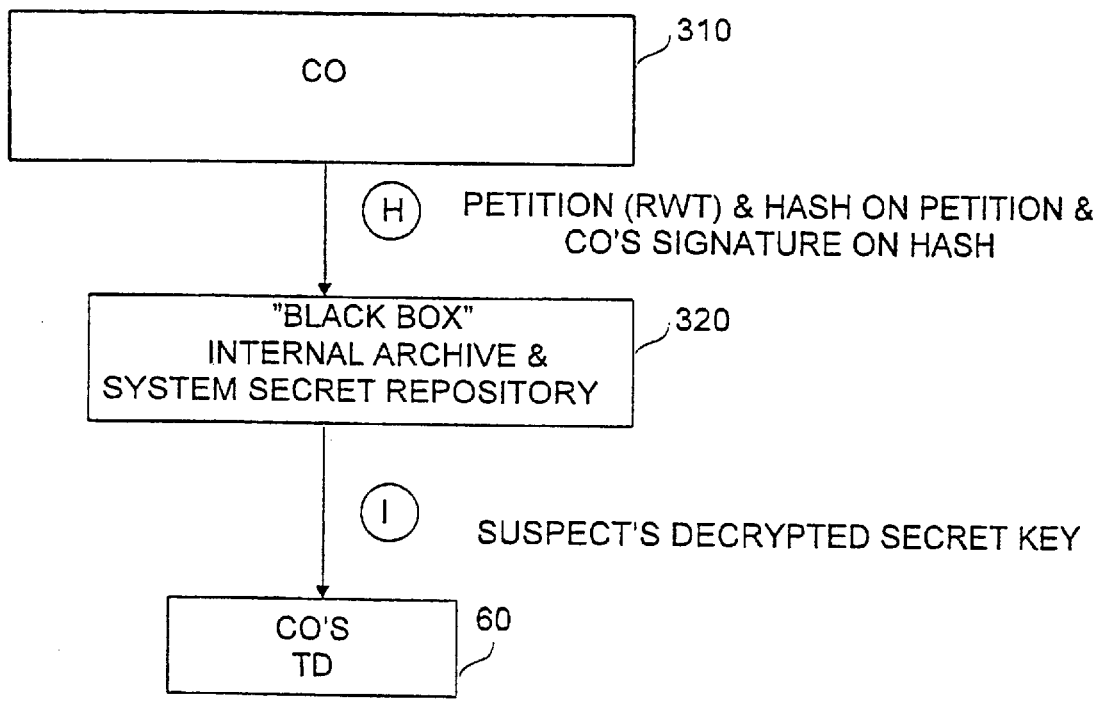
FIG. 5 is a diagram of transmissions between a company officer, a company's "black box" and the company officer's tapping device, in the course of inserting a suspect's secret key into the memory of the additional entity's tapping device.

Optionally, one or more additional entities, other than the international agency or agencies, can decipher communications between communicants who are subject to the additional entity, also termed herein a "company". In FIG. 5, the additional entity's deciphering operations are performed by a CO (company officer) 310 who has a "black box" which performs the functions of a combination of an agency and an archive. The "black box" 320 of FIG. 5 comprises a security module programmed to perform the above functions, plus memory sufficient to archive all petitions to tap entities of the "company".

Each communicant subject to the company is provided with a special security module. The special security module is similar to the security modules described above except that it includes an additional DRF comprising the secret key of the communicant encrypted using the public key of the company.

It is appreciated that a communicant may be subject to more than one "company" or closed group.

For example, a bank may impose upon the employees of the bank the requirement that communications between employees be decipherable by a CO within the bank, such as the senior security officer.

Figure 4:
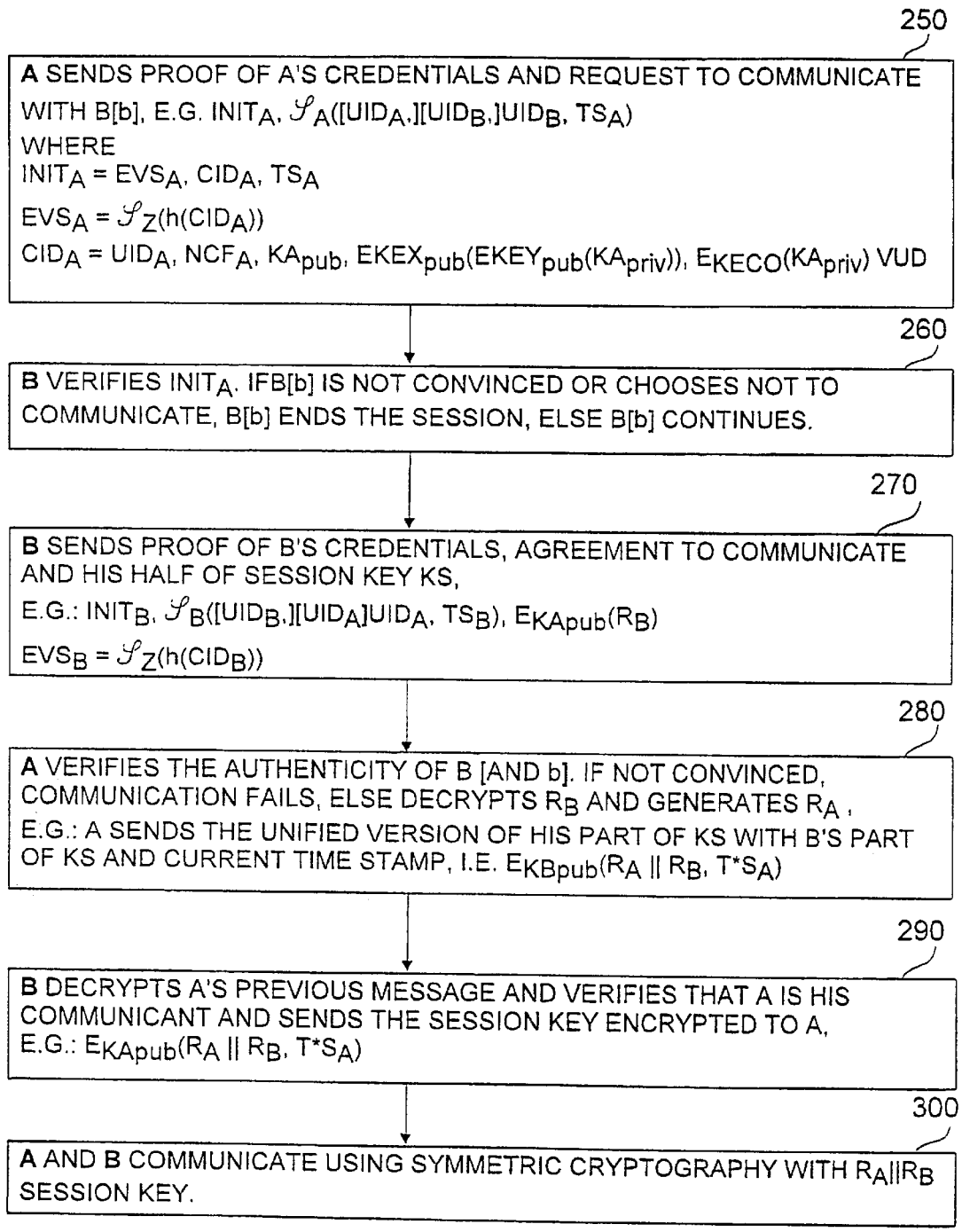
FIG. 4 is a simplified flowchart illustration of a method for establishing an encrypted dialogue between parties who wish to communicate which dialogue can potentially be monitored by at least one nation and by at least one additional entity.

If a pair of communicants subject to a company wish to conduct dialogue, that dialogue is established according to the method of FIG. 4 instead of according to the method of FIG. 2. The method of FIG. 4 is similar to the method of FIG. 2 except that, if A is subject to the bank, step 150 is replaced by a step 250 in which the credentials which Alice transmits additionally include a second DRF (secret key capsule) which includes Alice's secret key encrypted so as to be accessible to the bank or other additional entity. If B is subject to the bank, step 170 is replaced by a step 270 in which the credentials which Bob transmits additionally include a second DRF (secret key capsule) which includes Bob's secret key encrypted so as to be accessible to the bank or other additional entity.

The additional DRF's are disregarded by the recipients thereof, as well as by the judge, the archives, the agencies and the IOs' TDs.

FIG. 5 is a diagram of transmissions between a company officer, a company's "black box" and the company officer's tapping device, in the course of inserting a suspect's secret key into the memory of the additional entity's tapping device.

According to a preferred embodiment of the present invention, national sovereignty is retained in conjunction with international control. Each country is preferably able to decrypt messages initiated by one of their own nationals by obtaining knowledge of the secret key of the national. Each National N of a particular country is preferably able to designate other countries which are listed in that national's NCF (National Crossover Field) list. If National N lists country C in his NCF, country C is able to decrypt messages initiated by National N by obtaining knowledge of the secret key of National N.

Typically, country C cannot obtain knowledge of the secret key of an individual who is not a national of country C and who has not designated country C on his NCF list.

Figure 7:
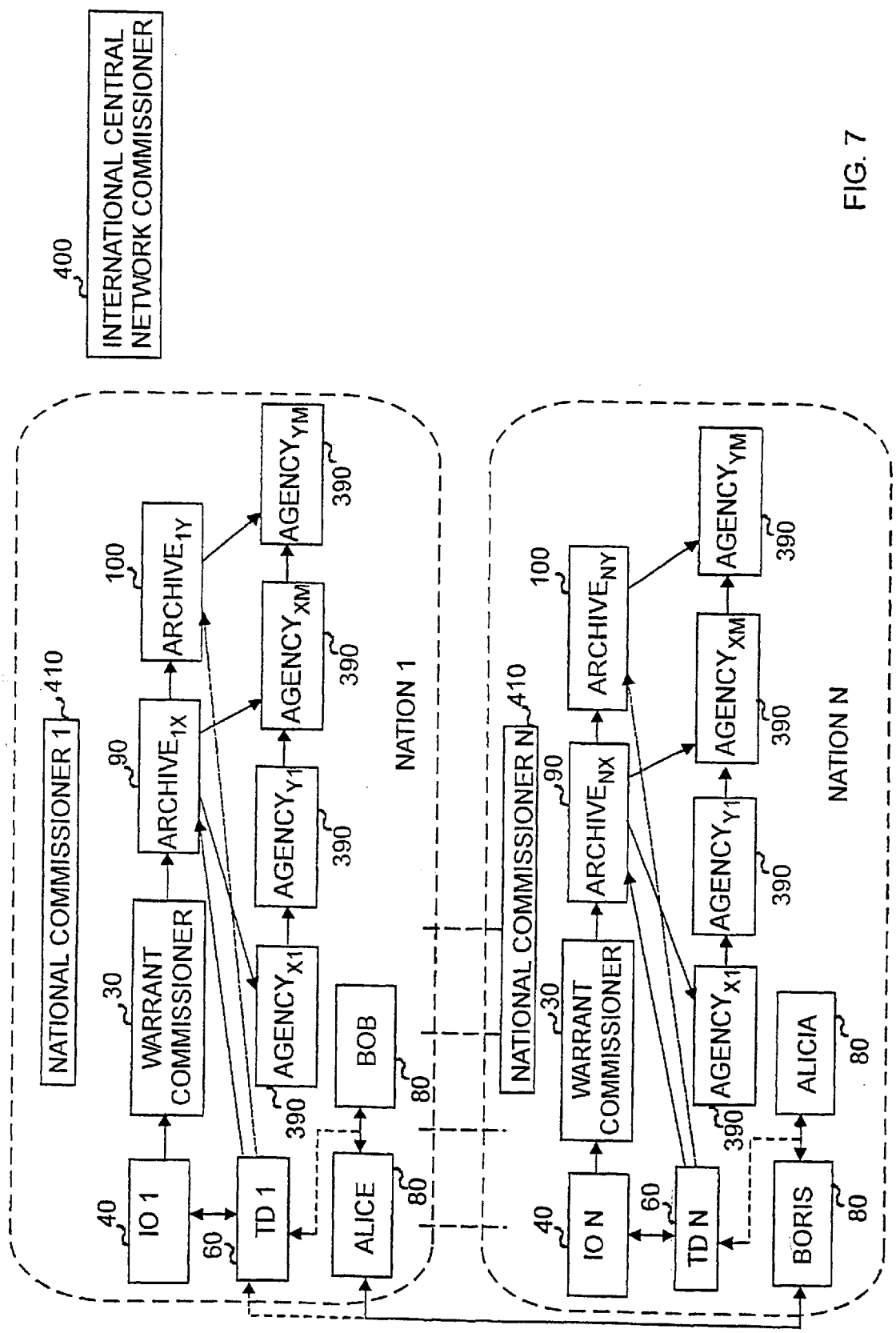
FIG. 7 is a modification of the system of FIG. 1 in which the international agencies which functioned as trusted third parties in FIG. 1 are replaced by a plurality of national agencies each functioning as a trusted third party in their own nation.

FIG. 7 is a modification of the system of FIG. 1 in which the international agencies 10 and 20 which functioned as trusted third parties in FIG. 1 are replaced by a plurality of national agencies 390, each functioning as a trusted third party in their own nation (say Nation 1), and on behalf of other nations, but only with respect to users in Nation 1 who designated those other nations. For example, if user U designated Nation K on his NCF, then the agencies in Nation 1 to which user U belongs will function on behalf of Nation K with regard to user U. The embodiment of FIG. 7 is useful in applications in which each nation wishes to maintain cryptographic sovereignty.

The tapping process illustrated in FIG. 3 is also useful for the embodiment of FIG. 7 except that Agency$_X$ and Agenc$_Y$, are replaced by a pair of agencies Agency$_{XJ}$ and Agency$_{YJ}$ within the nation which issued an SM to the tapped user.

The international central trusted agency 50 of FIG. 1 is replaced by an international central network commissioner 400 which typically has less functions than the agency 50, some of these functions being relegated, in FIG. 7, to national commissioners 410, one of which is provided per nation. The international commissioner 400 is typically only operative to:

a. Authorize or certify each of the national commissioners 410 to operate within the cryptographic community of nations;

b. Check that the subscriber units of the archives 90 and 100 and the agencies 390 are functioning properly, as by transmitting to these subscriber units a request to perform an operation whose output is known.

Each national commissioner 410 is operative within its own nation to set up the cryptographic system shown in FIG. 7, to operate in accordance with the methods shown and described herein.

A preferred procedure for setting up the system of FIG. 7 is as follows:

a. The international central network commissioner specifies security modules for each type of subscriber (SM issuers, warrant commissioners, archives, agencies IO's and ordinary users) and arranges for production of these security modules by reliable production facilities.

b. Each national government appoints national commissioners and defines national strategies.

c. National Commissioner receives (from the international central network commissioner) security modules storing his secret key and the ICNC's certificate on his public key.

d. Each National Commissioner delegates all of the above-described types of authorities, including SM issuers, warrant commissioners, archives, agencies, and IOs and deploys the security modules produced in (a) to these authorities according to national strategy.

e. The SM issuers deploy SMs to the population of users. Each such SM stores the National Commissioner's signature on its EVS.

Figure 8:
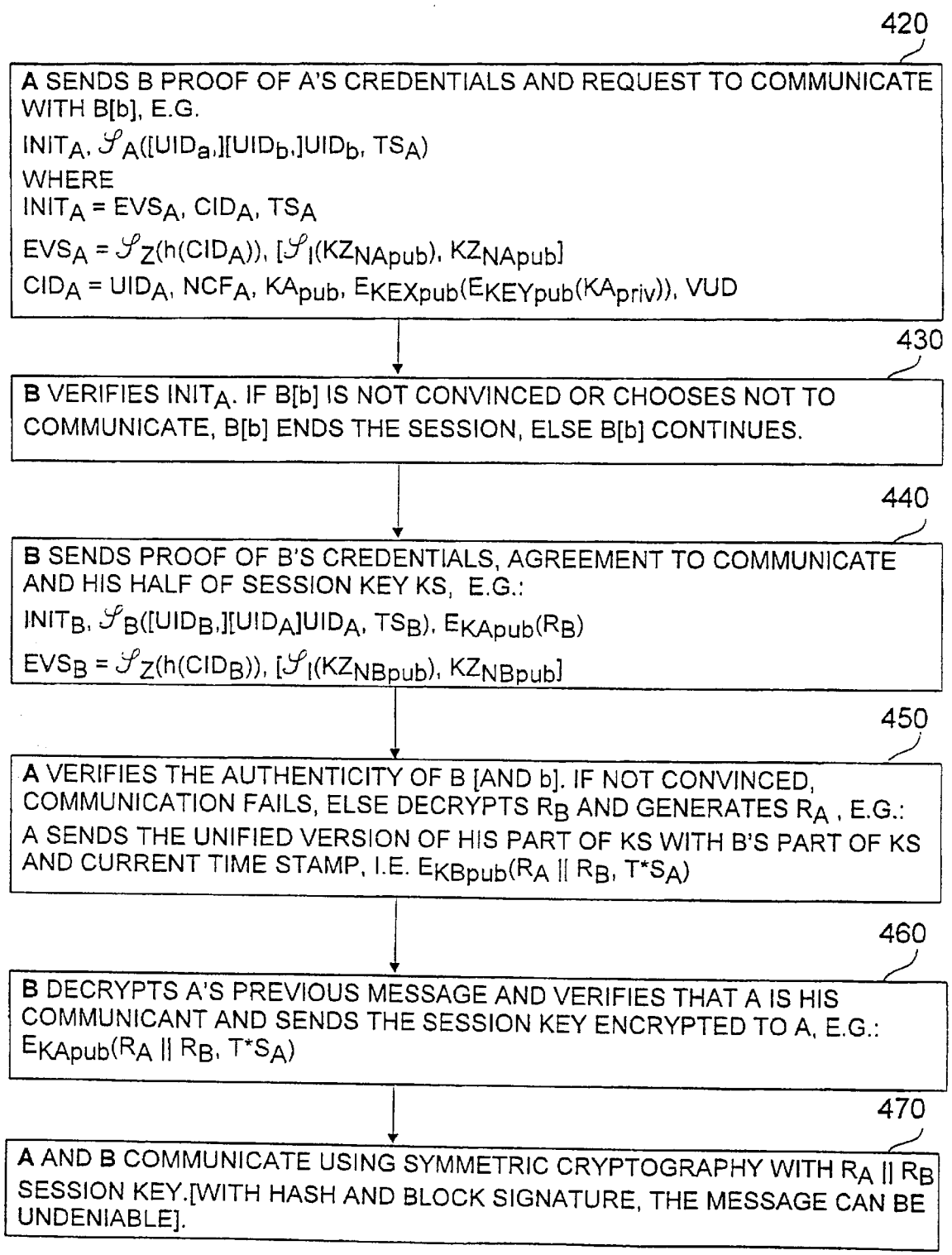
FIG. 8 is a modification of the dialogue establishing method of FIG. 2 in which each subscriber's certificate includes the certificate of a national commissioner appointed by the international central network commissioner of FIG. 7.

FIG. 8 is a modification of the dialogue establishing method of FIG. 2 in which each subscriber's certificate includes the certificate of a national commissioner appointed by the international central network commissioner of FIG. 7.

As shown in step 440, B's certificate, EVS$_B$, typically includes B's National Commissioner's public key, and the same public key signed by the International Central Network Commissioner.

Figure 9:
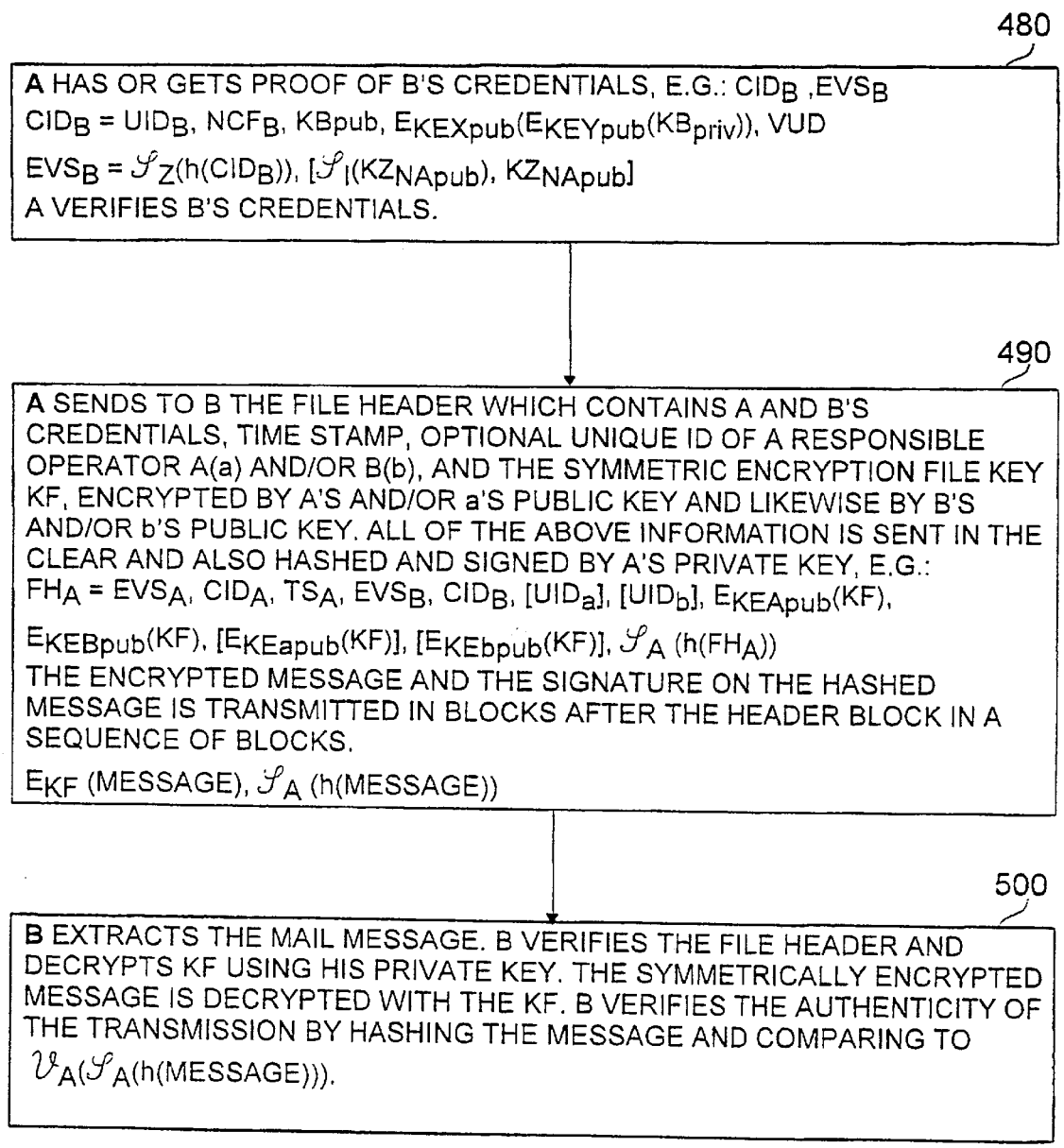
FIG. 9 is a flowchart illustration of a method for transmitting an electronic mail message which preferably must be used by all subscribers communicating by electronic mail.

FIG. 9 is a flowchart illustration of a method for transmitting an electronic mail message, which method preferably must be used by all subscribers communicating by electronic mail. The method of FIG. 9 is feed-forward, that is, without feedback, and does not require that the sending subscriber "handshake" with the receiving subscriber.

The method of FIG. 9 preferably includes the following steps:

A verifies B's credentials (step 480). A initiates a transmission with a header that contains A's credentials and the session key encrypted using both A's public key and B's public key (step 490). A extracts the mail message (step 500).

Figure 10:
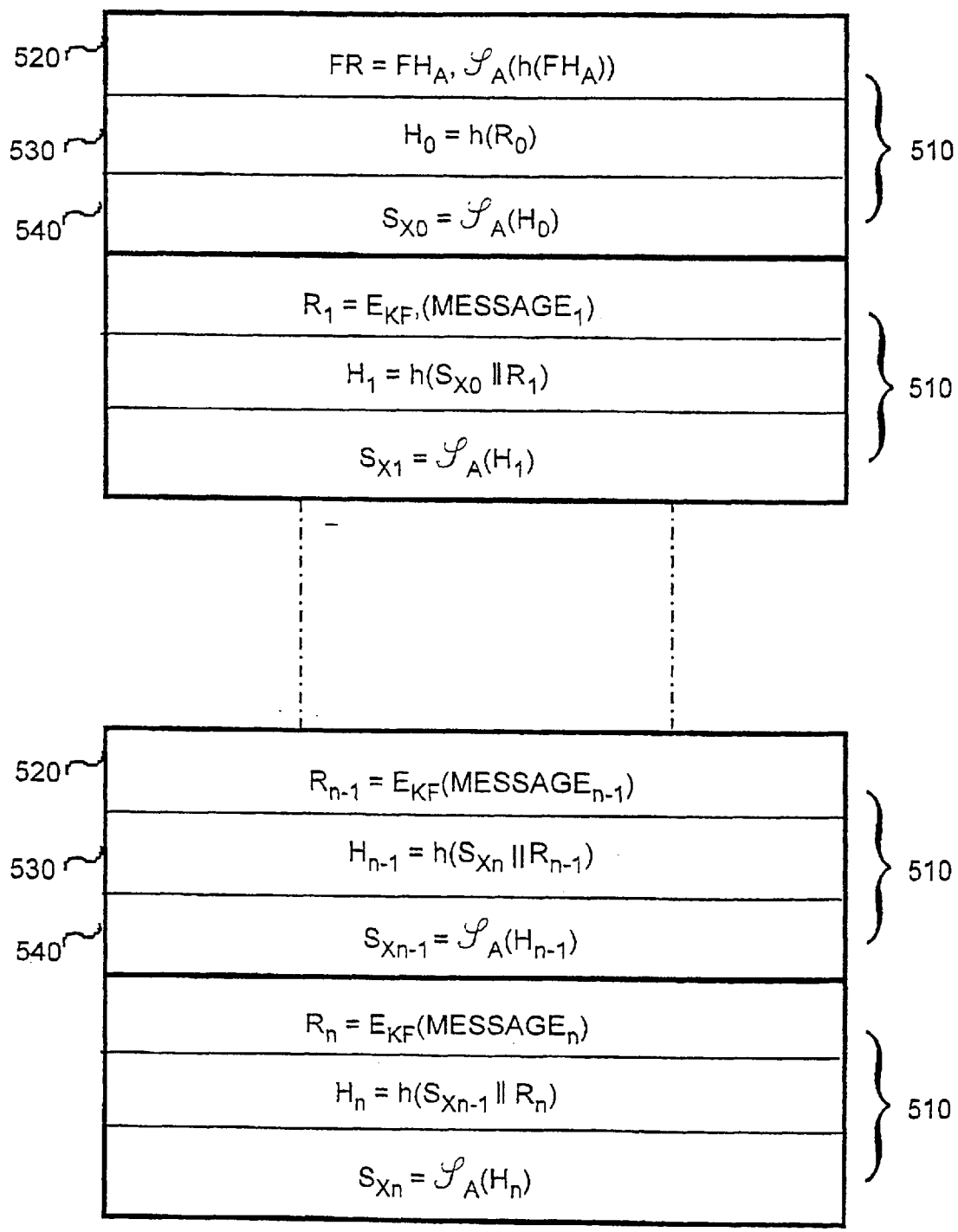
FIG. 10 is a diagrammatic illustration of a transmission including a plurality of blocks each including an encrypted message block, a hash of the encrypted message block and the signature from the previous block, and a signature on the hash.

FIG. 10 is a diagrammatic illustration of a transmission including a plurality of blocks 510 each including an encrypted message block 520, a hash 530 of the encrypted message block and the signature from the previous block, and a signature 540 on the hash.

Figure 11:
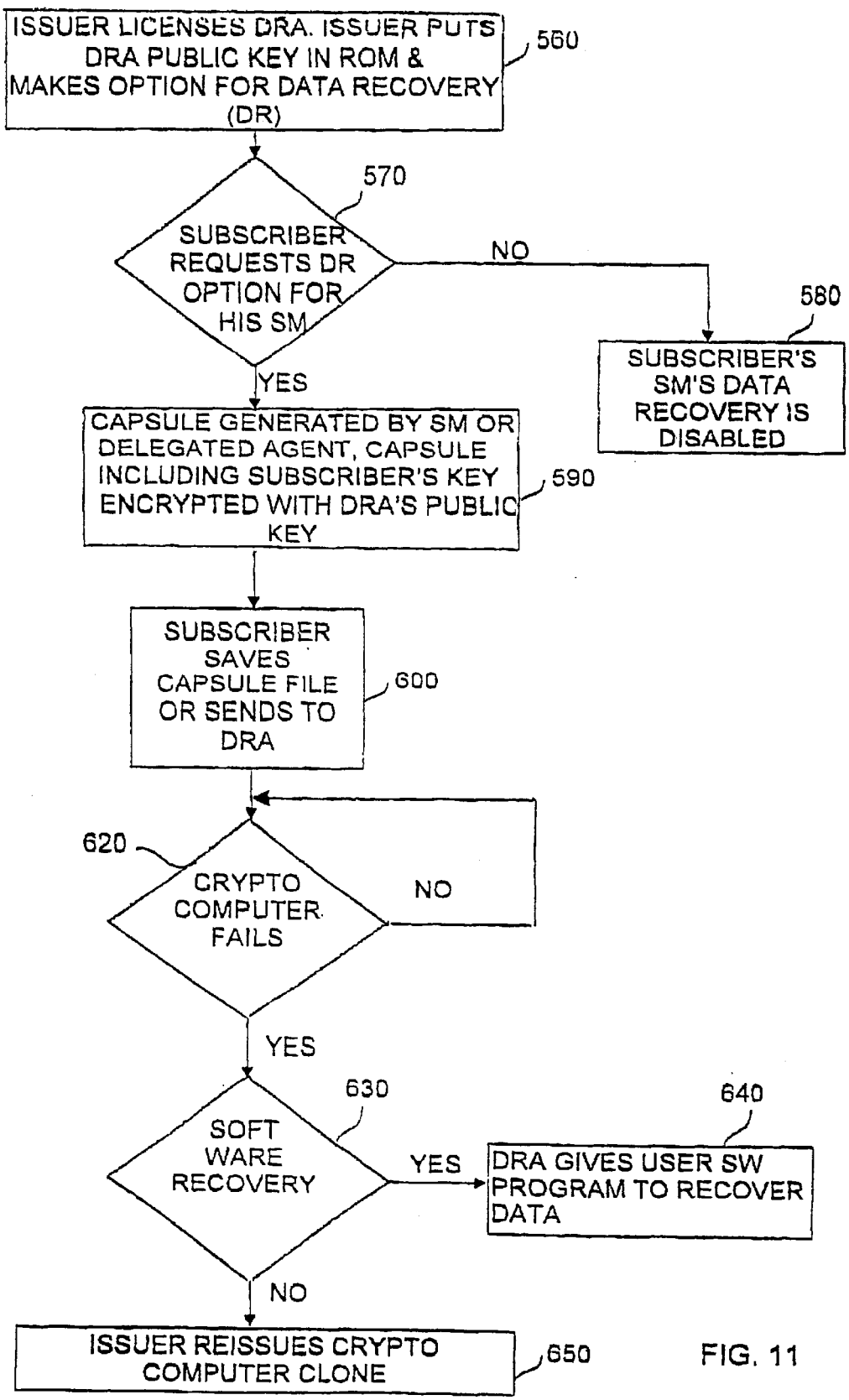
FIG. 11 is a flowchart of a preferred method for recovering data encrypted with a failed security module and/or for replacing a failed security module.

FIG. 11 is a flowchart of a preferred method for enabling data encrypted with a failed security module to be recovered and/or for replacing a failed security module. The "issuer", whose identity is determined by national strategy, refers to the entity who provides each subscriber with a security module, optionally (step 560), the issuer licenses or appoints a data recovery agency which enables the issuer's subscribers to recover data encrypted with a failed security module or replace a failed security module.

If (step 570) a subscriber elects not to have a data recovery option for his SM, e.g. when he purchases his SM from the issuer, then (step 580) that subscriber's SM's data recovery functionality, as described below, is disabled.

If the subscriber elects to have a data recovery option for his SM, then (step 590) the SM issued to that subscriber includes a capsule file storing the subscriber's secret key encrypted with the data recovery agency's public key.

Typically, whether or not the data recovery option is actualized, an SM's secret key is generated either by the SM itself or by a delegated secret key generating entity, depending on national strategy. Similarly, the capsule file is generated either by the SM itself or by a delegated secret key generating entity.

Step 600 —The subscriber stores the capsule file in a safe place, such as on diskette in a safety deposit box or alternatively the issuer or the subscriber provide the capsule file to the DRA for safekeeping.

Step 620 —Until the SM's cryptocomputer fails, nothing happens. If the DRA is reliably informed that the SM's cryptocomputer has failed (step 620), i.e. the subscriber succeeds in persuading the DRA to accept his contention that his SM has failed, then Step 630 —If the subscriber merely requests software recovery, step 640 is performed whereas if the subscriber requests issuance of a clone of his SM, step 650 is performed.

Step 640 —The user receives from the DRA a software program which possesses the decryption abilities of the original SM and uses the software program to recover the lost data.

Step 650 —the DRA sends an issuer the subscriber's secret key, signed by him and encrypted to the issuer, and the issuer generates an SM which uses the subscriber's secret key.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. An encryption method for generating an encrypted message which is controllably decryptable, the method comprising:

providing at least one agency public key to at least one decrypting agency entity respectively and to each of a first plurality of subscriber entities and to each of a second plurality of regulator entities;

providing an ID, a public key and a private key for each of the first plurality of subscriber entities and each of the second plurality of regulator entities;

for each subscriber entity and for each regulator entity, employing at least one agency public key to encrypt the entity's private key; and for each individual subscriber entity and for each individual regulator entity, generating a certificate attesting, for all other entities, to the individual entity's status, ID, public key and encrypted private key.

2. A method according to claim 1 wherein said at least one decrypting agency comprises a plurality of decrypting agencies.

3. A method according to claim 1 wherein each subscriber entity and each regulator entity generates his own private and public keys.

4. A method according to claim 1 and also comprising:

transmitting a second subscriber entity's certificate to a first subscriber entity; and generating a first random string at said first subscriber entity, signing the random string using the first subscriber entity's private key and encrypting the random string using a second subscriber entity's public key and transmitting to the second subscriber entity the first subscriber entity's certificate and the encrypted and signed random string.

5. A method according to claim 4 and also comprising:

generating a second random string at the second subscriber entity and combining the second random string and the encrypted and signed first random string;

encrypting the combined strings using the first subscriber entity's public key and transmitting to the first subscriber entity;

at the first subscriber entity, encrypting the encrypted combined strings using the second subscriber entity's public key and transmitting to the second subscriber unit; and decrypting the encrypted combined strings and transferring messages encrypted using the combined strings.

6. A method according to claim 5 wherein combining comprises concatenating.

7. A method according to claim 5 wherein combining comprises XORing.

8. A method according to claim 4 wherein said step of transmitting to the second subscriber entity comprises transmitting over an open channel.

9. A method according to claim 8 wherein said step of transmitting to the second subscriber entity comprises transmitting via a telephone connection.

10. A method according to claim 8 wherein said step of transmitting to the second subscriber entity comprises transmitting via a computer connection.

11. A method according to claim 1 and wherein employing comprises employing the at least one agency public key without the agency's knowledge or implicit agreement.

12. A method according to claim 1 wherein said second plurality of regulator entities comprises a third plurality of subsets of regulator entities, each subset regulating encrypted communications in accordance with a national encrypted communication regulation strategy characterizing an individual nation from among a third plurality of nations.

13. A method according to claim 12 wherein said at least one decrypting agency comprises a third plurality of decrypting agencies including at least one decrypting agency operating in accordance with a national encrypted communication regulation strategy characterizing each of said third plurality of nations.

14. A method according to claim 1 and also comprising: transmitting a receiver subscriber entity's certificate to a sender subscriber entity.

15. A method according to claim 14 wherein said sending step comprises the step of sending by electronic mail.

16. A method according to claim 14 and said message and said encrypted session keys are sent signed by said sender subscriber entity.

17. A method according to claim 1 and also comprising:

providing the public key of at least one key recovering subscriber entity to each of said first plurality of subscriber entities; and for at least one subscriber entity, generating a key recovery unit by encrypting said subscriber entity's secret key using said public key of said key recovering subscriber entity.

18. A method according to claim 17 wherein said recovering subscriber entity's public key providing step comprises placing the public key of said key recovering subscriber entity in a memory location disposed within each of said first plurality of subscriber entities and characterized in that the public key is not extractable from said memory location.

19. A method according to claim 1 and wherein each subscriber entity operates in accordance with a protocol the subscriber entity cannot change and wherein said protocol prevents each subscriber entity from transmitting a message which has not been signed by said subscriber entity.

20. A method according to claim 1 and also comprising preventing a communication session, based on an individual session key, between subscriber entities A and B from among the multiplicity of subscriber entities, unless the individual session key has been transmitted from one subscriber entity to another, encrypted once using B's; public key and once using A's public key, thereby to ensure that no communication session can take place unless the communication session's session key is accessible to a possessor of A's secret key and also to a possessor of B's secret key.

21. An encryption method comprising:

providing first and second private keys to first and second agencies, respectively, wherein the first and second private keys are paired with first and second public keys respectively, wherein the first and second private keys are characterized in that when employed in cooperation and only when employed in cooperation, a message double-encrypted using the first and second public keys may be decrypted; and generating a protocol controlling cooperation between the first and second agencies to prevent unlawful decrypting of the double-encrypted message by the first and second agencies.

22. A method according to claim 21 wherein said first and second private keys are stored in first and second secured electronic devices respectively.

23. A method according to claim 22 wherein said first and second secured electronic devices comprise first and second monolithic secured electronic devices.

24. A method according to claim 21 and also comprising archiving a record of operations authorized by the first and second agencies.

25. A method according to claim 24 wherein the archiving step comprises archiving the record in a plurality of separate archives.

26. A method according to claim 25 wherein removal of any record from any of said archives is detectable.

27. A system for controlling tapping of a suspect encrypted communication, the system comprising:

a multiplicity of security modules each encrypting information using a different session key and each transmitting, in addition to said information, his own secret key, encrypted using at least one agency key wherein information transmitted in the course of a session between a security module A from among said multiplicity of security modules, and another security module B, can only be decrypted by a tapping security module if the at least one agency key retrieves A's secret key for the tapping security module;

an agency security module which does not store the secret keys and which stores the agency key so as to prevent access thereto by any of the multiplicity of security modules; and an agency access monitoring module monitoring use of the agency key so as to prevent use of the agency key to facilitate unlawful tapping.

28. A system according to claim 27 wherein each security module comprises at least one integrated circuit.

29. A system according to claim 27 wherein each security module comprises:

a key securing unit storing an individual subscriber entity's secret key from among a corresponding multiplicity of secret keys so as to prevent access to the individual secret key by entities other than the individual subscriber entity's security modulel and a public key cryptographic unit authenticating arriving information encrypted according to a public key cryptographic method and to generate a DRF and to encrypt information using said secret key and first and second agency keys.

30. A key recovering method comprising:

providing a public key of at least one key recovering subscriber entity to each of a plurality of subscriber entities;

for at least one of the plurality of subscriber entities,
generating a key backup unit on which is stored said subscriber entity's secret key encrypted using said public key of said key recovering subscriber entity; and upon loss of the secret key, presenting said key backup unit to the key recovering subscriber entity for recovery of the subscriber entity's secret key.

* * * * *